Figure 1:
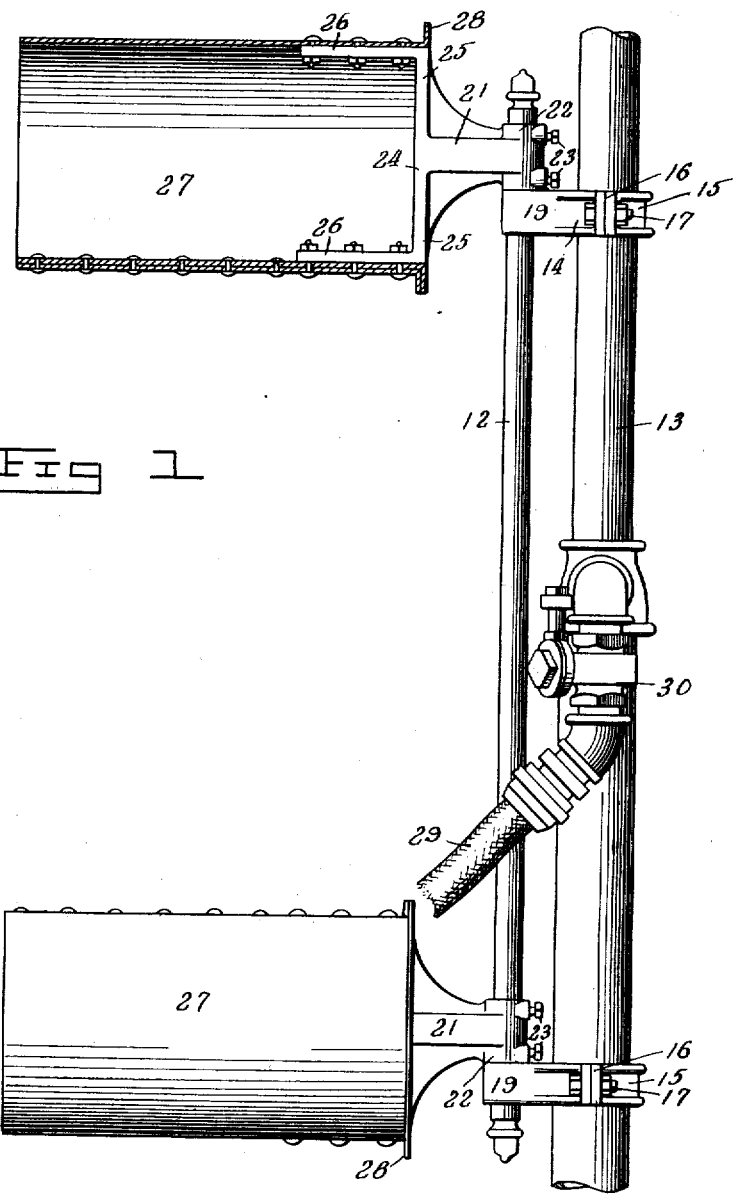

P. MUELLER & W. T. MASON.
HOSE SUPPORT FOR FIRE HOSE.
APPLICATION FILED MAR. 28, 1911.

1,023,218.

Patented Apr. 16, 1912.
2 SHEETS—SHEET 1.

Witnesses
H. L. Johnette
G. M. Stucker

Inventors
Philip Mueller
William T. Mason

By Meyers, Cushman & Rea
Attorneys

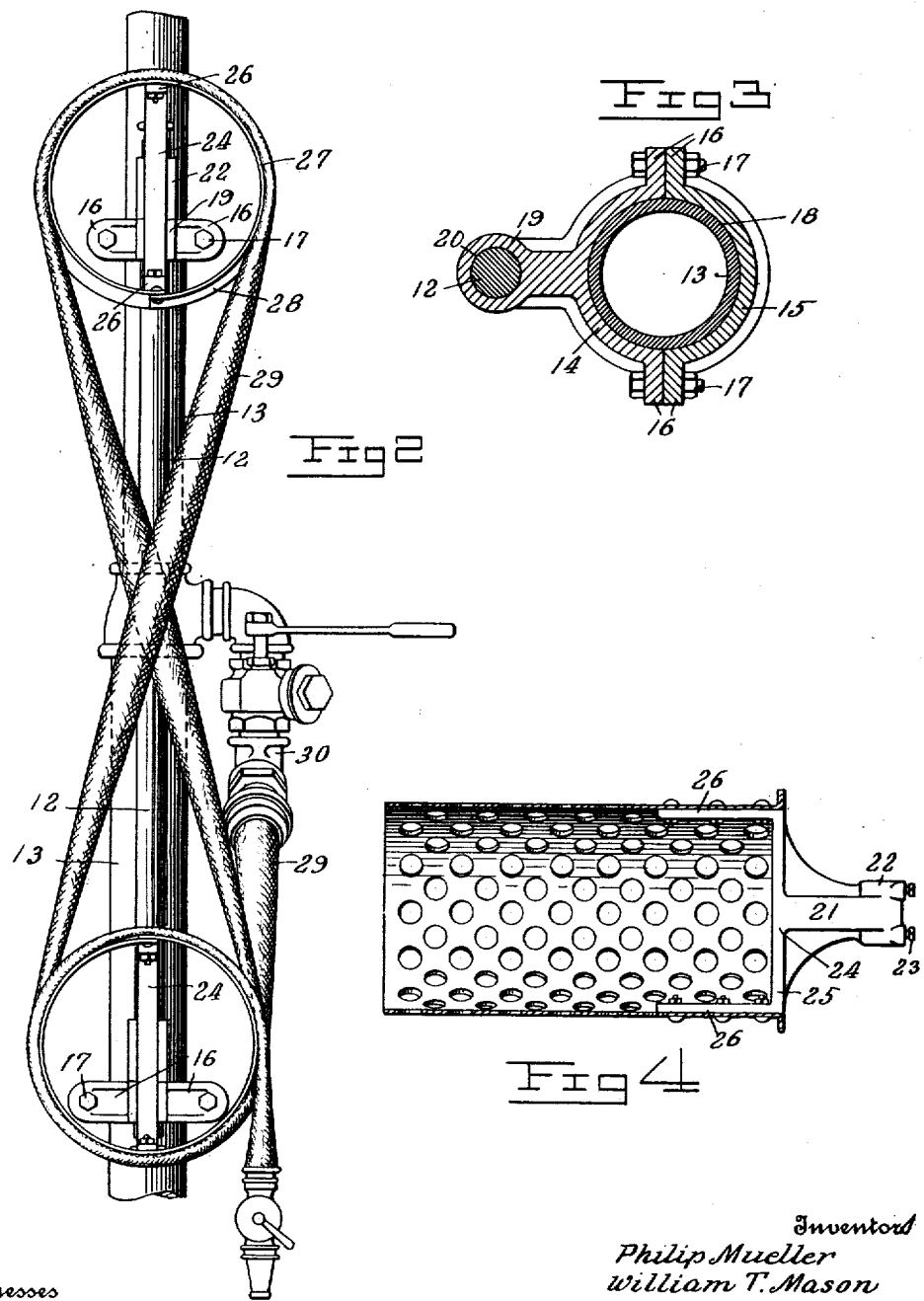

UNITED STATES PATENT OFFICE.

PHILIP MUELLER AND WILLIAM T. MASON, OF DECATUR, ILLINOIS, ASSIGNORS TO H. MUELLER MANUFACTURING COMPANY, OF DECATUR, ILLINOIS, A CORPORATION OF ILLINOIS.

HOSE-SUPPORT FOR FIRE-HOSE.

1,023,218.   Specification of Letters Patent.   Patented Apr. 16, 1912.

Application filed March 28, 1911. Serial No. 617,478.

*To all whom it may concern:*

Be it known that we, PHILIP MUELLER and WILLIAM T. MASON, citizens of the United States, residing at Decatur, in the county of Macon and State of Illinois, have invented new and useful Improvements in Hose-Supports for Fire-Hose, of which the following is a specification.

Our present invention relates to certain new and useful improvements in hose supports for fire hose, and more especially to that type of support that is adapted to be mounted upon a fixed supporting member, such for instance as the water stand-pipe from which the hose receives its supply of water.

The prime object of the invention is to provide a hose support that is simple and durable in construction, cheap to manufacture and one wherein the several coils of the hose, when wound upon the support, will be separated one from the other, so as to be easily and quickly removed for use, and wherein the coils will be so disposed that should the water be turned on before the hose is removed from the support, its free flow will not be choked or impeded by reason of the coils overlapping or crowding one another.

A further object of the invention is to provide a hose support, wherein the several coils or coil-windings of the hose, when wound upon the said support, will be so separated or spaced apart that air may freely circulate around substantially all portions thereof, whereby the hose will readily and quickly dry, even if placed upon its support in a damp or wet condition.

A still further purpose of the invention is to provide a hose support that has a hinged or swinging connection with the part to which it is attached, such for instance as a stand-pipe, whereby the whole structure may be swung to either side, so as to be positioned close to a wall where it will be out of the way when the hose is not in use, or may be moved outwardly at any angle to the wall.

Other more or less important objects will appear hereinafter from a reading of the detailed description of the invention which will follow.

Briefly and generally stated the invention comprises a pair of spaced hose supporting members located one above the other, a connecting means between said members, and means for attaching said connecting means to a suitable fixed support.

In the accompanying drawings which are illustrative of a preferred embodiment of the invention, Figure 1 is a side elevation of our improved hose support shown clamped to a stand-pipe. Fig. 2 is an outer end view of the same. Fig. 3 is a horizontal section through one of the clamping devices employed and being attached to the stand-pipe. Fig. 4 is a sectional detail of a modified form of the supporting drum.

Referring to the drawings the reference numeral 12, designates a vertically disposed rod or shaft to the opposite ends of which are attached our improved supporting members for the hose as will be presently made clear. The rod or shaft 12 is supported in an upright position by means of a pair of similarly constructed clamping members, which in the instance shown, are attached to a water stand-pipe 13. Each clamp consists of two jaw-blocks 14, 15, provided on opposite sides respectively with laterally extending lugs 16, through which bolts 17 pass and by which the blocks may be firmly clamped to the stand-pipe, it being understood of course that when the two blocks are placed together, as more clearly shown in Fig. 3, an opening 18, will be formed between them to receive the stand pipe 13. Each jaw block 14 is further provided with an outwardly extending ear-like portion 19, provided with an opening 20 extending longitudinally therethrough to receive the rod or shaft 12.

As will be seen by referring to the drawings, two sets of jaw blocks are employed and these are clamped to the stand-pipe one above the other in such a manner that the openings 20 will be in vertical alinement so as to support the rod or shaft 12 in a true vertical position.

As before stated there are two supporting drums or members for the hose and these are secured to opposite ends of the rod or shaft 12, and they are arranged the one directly above the other. As the carriers for the drums are identical in construction, a description of one will suffice for both. Each drum carrier consists of a casting in the form of a bracket arm 21, having at one end an eye portion 22, through which the rod or shaft 12, passes, the said arm being firmly secured to the said shaft by means of set screws 23. At its other end the arm 21 is provided with a cross piece 24, the opposite ends 25 of which branch outwardly at right angles thereto to provide a pair of spaced parallel rests 26 to which are secured the drums 27 which, in the present instance are of drum form, each consisting of a metallic cylinder which is bolted to the rests 26, as shown. We prefer to make the cylinders of perforated, reticulated or open-work material in order that air may freely circulate therethrough and thus enable the coils of the hose to become more quickly and thoroughly dried at those portions which come in direct contact with the cylinder. Each cylinder is provided at its attached or inner end with an outstanding annular flange 28, which serves as a stop or abutment for the first coil of the hose, in order to prevent the same from overriding the end of the cylinder.

It will be seen by referring to the foregoing description taken in connection with the accompanying drawings, that the drums and their carrier-arms, as well as the jaw-blocks, are constructed in pairs, each of the members of any particular pair being duplicates of one another, thus the cost of manufacture is reduced to a minimum, and besides the various parts of the apparatus may be easily and quickly assembled as the parts are interchangeable and care need not be exercised in selecting them.

When the apparatus is installed as illustrated in Fig. 1, it will be understood that the two hose-drums are rigidly attached to the rod or shaft 12 so as to turn or swing therewith, the underface of the eye portion 22 of the bracket arms having bearing contact with the upper face of the ear-like portion 19 of the jaw-blocks 14, hence the two drums may be swung in the arc of a circle to bring them to any desired position most conveniently suited to the conditions.

Inasmuch as the jaw blocks may be clamped to the stand-pipe at any desired distance apart, and likewise the drum carrier arms may be similarly adjusted upon the rod or shaft, it will be apparent that the drums or hose supporting members may be separated from one another to any extent desired in order to accommodate a greater or less length of hose without the necessity of having the coils of the hose overlap one another.

The manner of coiling the hose upon the drums is more clearly shown in Fig. 2, where it will be seen that the hose 29, which is coupled to the branch outlet 30 of the stand-pipe, is first carried under the lowermost drum from one side and then passed up over the uppermost drum from the other side, the several coils being successively passed under and over the two drums and crossing one another between the drums. By laying the coils in this manner there is no danger of the hose becoming entangled and should the water be turned on while the hose is still upon its supporting members, there is plenty of room for the coils to expand without danger of choking or restricting the free passage of the water, and furthermore the hose may be very easily and freely drawn from the supporting drums as no one coil is in overlapping engagement with its adjacent, or any other coil.

If the apparatus is to be attached to a wall or other flat supporting member, instead of a stand-pipe, only the jaw-blocks 14, will be employed and the fastening screws for attaching them to such support will be passed through the laterally extending lugs 16.

While we have herein shown and described the best form of apparatus now known to us, we do not wish to be understood as limiting ourselves to the specific details of construction and arrangement of parts illustrated, as obviously slight changes or additions may be made without departing from the spirit of the invention.

What we claim is:—

1. A hose support comprising a pair of vertically spaced jaw blocks mounted for circular and vertical adjustment upon a stand-pipe and having outstanding ears, a shaft journaled through the ears, a pair of registering bracket arms mounted for circular and longitudinal movement upon the shaft, said bracket arms being provided with cross pieces on their outer ends carrying outstanding rests, drums mounted upon the rests and extending outwardly therefrom and fastening means for the bracket arms to secure the same in the desired adjustment upon the shaft.

2. In a hose support a pair of spaced drums, a shaft, bracket arms carried by the drums adjustably engaging the shaft for longitudinal and circular adjustment thereon, and a pair of jaw blocks hinged upon the shaft and adapted for longitudinal adjustment thereon, said jaw blocks being adapted to adjustably engage a stand-pipe.

In testimony whereof we have hereunto set our hands in presence of two subscribing witnesses.

PHILIP MUELLER.
WILLIAM T. MASON.

Witnesses:
LEONARD F. McKIBBEN,
WILLIAM R. BIDDLE.